July 17, 1923.

W. JAQUIERY 1,461,848

TUBE FORMING MACHINE

Filed March 31, 1922 3 Sheets-Sheet 1

INVENTOR.
William Jaquiery
BY H. G. Manning
ATTORNEY

July 17, 1923.
W. JAQUIERY
1,461,848
TUBE FORMING MACHINE
Filed March 31, 1922
3 Sheets-Sheet 2
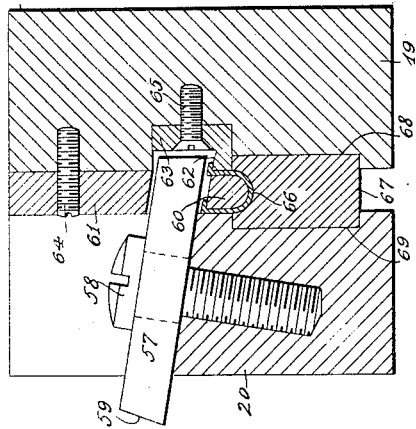
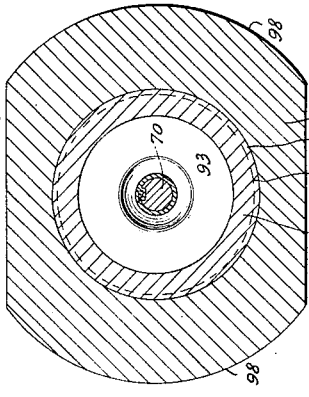
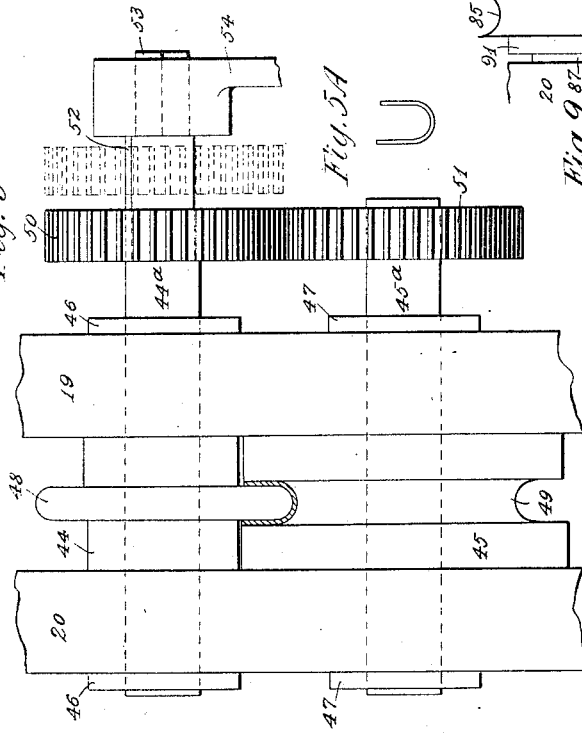
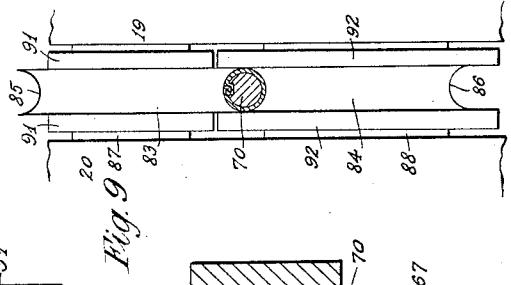
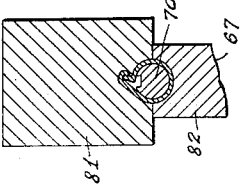
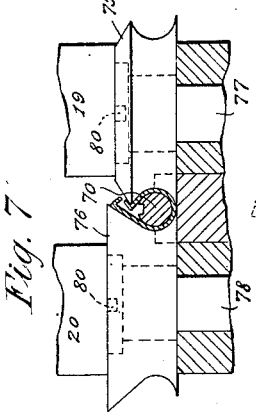
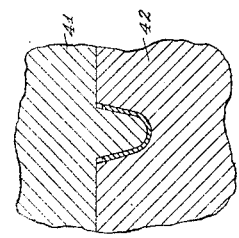
INVENTOR.
*William Jaquiery*
BY *H. G. Manning*
ATTORNEY July 17, 1923.
W. JAQUIERY
1,461,848
TUBE FORMING MACHINE
Filed March 31, 1922
3 Sheets-Sheet 3
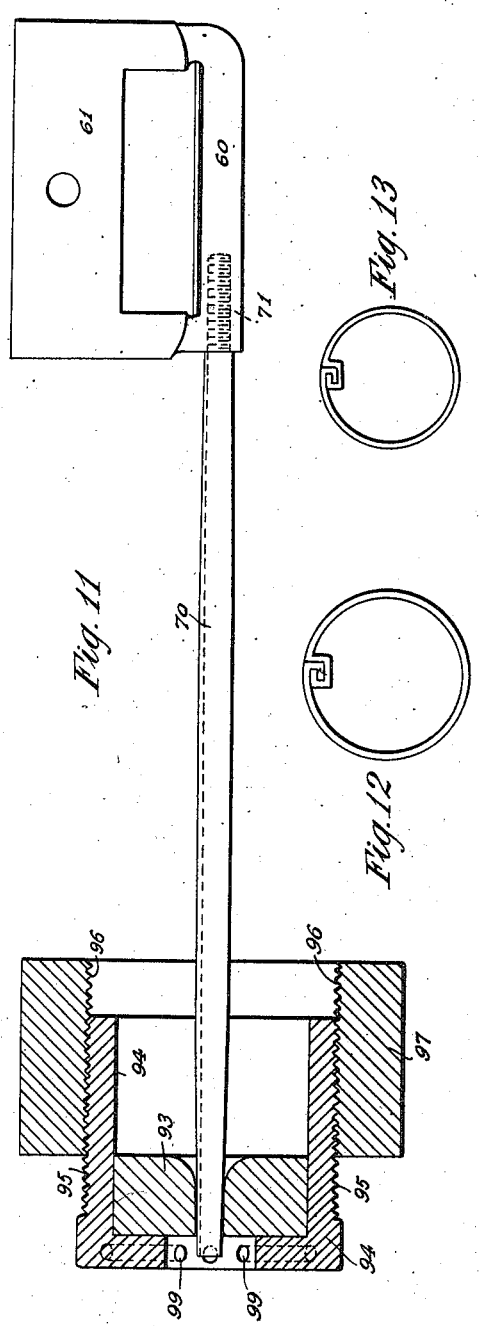
INVENTOR:
William Jaquiery
BY H. G. Manning
ATTORNEY Patented July 17, 1923.

1,461,848

UNITED STATES PATENT OFFICE.

WILLIAM JAQUIERY, OF WATERBURY, CONNECTICUT.

TUBE-FORMING MACHINE.

Application filed March 31, 1922. Serial No. 548,303.

*To all whom it may concern:*

Be it known that I, WILLIAM JAQUIERY, a citizen of the United States, and a resident of Waterbury, county of New Haven, and State of Connecticut, have invented certain new and useful Improvements in Tube-Forming Machines, of which the following is a specification.

This invention relates to tube-forming machines and more particularly to a machine for producing a continuous tube with a locked seam from a strip of sheet metal.

One object of the invention is to produce a tube-forming machine in which the initial and final tube-shaping operations are accomplished by means of dies and rolls.

A further object is to produce a continuous tube-forming machine operated without the use of pulleys, belts, gears or other mechanism.

A further object of the invention is to produce a machine of this character in which the metal strip is operated on by a series of rolls and dies located in close proximity to one another, whereby twisting of the strip will be practically prevented.

A further object is to provide a tube-forming machine having all of the rolls and dies mounted on a single support, so that they cannot work out of alinement.

A further object is to provide an improved machine of this character having a series of forming dies and rolls, and a mandrel for supporting the inside of the metal strip.

A further object is to provide a machine of the above character having a stationary mandrel, and in which the adjustment of the mandrel may be accomplished by moving the final shaping die relative to the mandrel.

A further object is to provide a machine of this character which will be simple, compact, cheap to manufacture, and very efficient and durable in use.

With these and other objects in view, there have been illustrated in the accompanying drawings two forms in which the invention may be conveniently embodied in practice.

Fig. 4 is an enlarged sectional view with parts broken away of the U-forming die, taken along the line 4—4 of Fig. 2, looking in the direction of the arrows.

Fig. 4$^A$ is a view showing the shape of the metal strip as it appears after passing through the U-forming die illustrated in Fig. 4.

Figure 2:
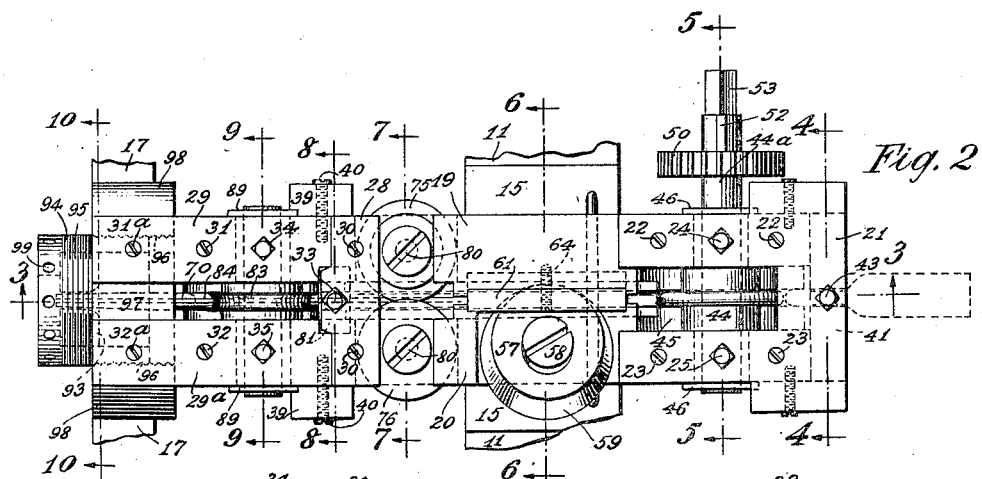
Fig. 2 is a top plan view of the machine illustrated in Fig. 1.

Fig. 5 is an enlarged end view with parts broken away of the squaring-up rolls, taken along the line 5—5 of Fig. 2.

Fig. 5$^A$ is a view showing the shape of the metal strip as it appears after passing through the squaring-up rolls illustrated in Fig. 5.

Fig. 6 is an enlarged sectional view of the edge-bending die and idler roll, taken along the line 6—6 of Fig. 2.

Fig. 6$^A$ is a view of the metal strip as it appears after passing through the edge-bending die and roll illustrated in Fig. 6.

Fig. 7 is an enlarged view partly in section with parts broken away of the tube-forming rolls and mandrel, taken along the line 7—7 of Fig. 2.

Fig. 7$^A$ is a view showing the shape of the tube as it appears after it leaves the rolls illustrated in Fig. 7.

Fig. 8 is an enlarged sectional view of the locking die, mandrel, and anvil with parts broken away, taken along the line 8—8 of Fig. 2.

Fig. 8$^A$ is a view showing the shape of the tube as it appears after passing through the locking die, mandrel, and anvil illustrated in Fig. 8.

Fig. 9 is an enlarged view, partly in section and with parts broken away, of the tube-closing rolls, taken along the line 9—9 of Fig. 2.

Fig. 9$^A$ is a view showing the shape of the tube as it appears after passing through the tube-closing rolls illustrated in Fig. 9.

Fig. 10 is an enlarged sectional view of the final sizing die, mandrel and die-holder, taken along the line 10—10 of Fig. 2.

Fig. 11 is an enlarged side view partly in section of the mandrel and its holder, together with the final-sizing die and its holder.

Figs. 12 and 13 are enlarged views showing the relative appearance of the tube before and after it has passed through the final sizing die.

Fig. 14 is an end view of a modified form of final-sizing die and mandrel, adapted to produce a tube having an outside rib and a smooth interior surface.

Fig. 15 is an enlarged view showing the shape of the tube formed by the die and mandrel illustrated in Fig. 14.

Referring now to the drawings in which like reference numerals denote corresponding parts throughout the several views, 10 represents the bed-plate of the machine, upon which is mounted a front bracket 11. This front bracket 11 has a flat base 12 with slots 13 in the ends thereof, through which the screws 14 are adapted to pass, and the bracket 11 is also provided with a pair of up-standing arms 15 having adjusting bolts 16.

Figure 1:
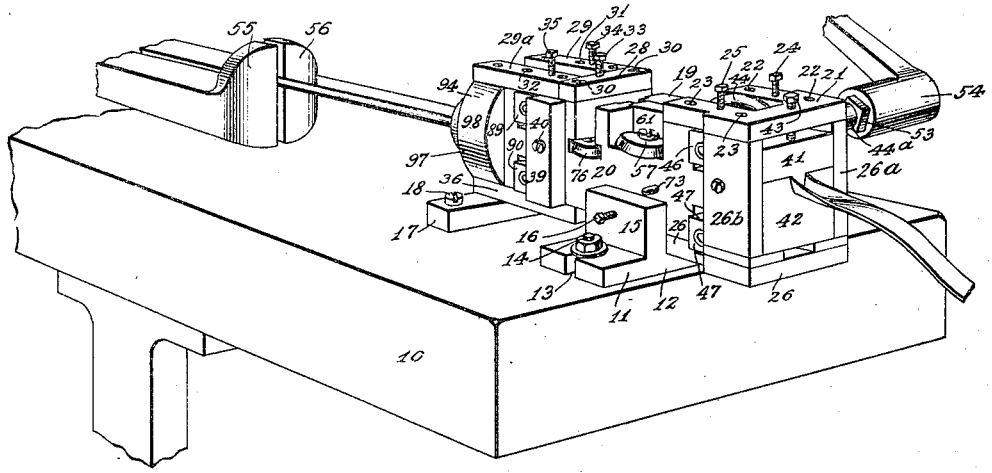
Fig. 1 is a perspective view of a machine embodying the invention and showing the metal strip entering at one end and the finished tube being drawn out at the other end.

A rear bracket 17 is also mounted on the bed plate 10 and is secured thereto by screws 18. The tube-forming mechanism is carried within a casing comprising a right-hand side frame 19 and a left-hand side frame 20. As clearly shown in Fig. 1, these frames 19 and 20 are supported by the front and rear brackets 11 and 17. A front top-cap 21 covers the top of the forward end of the side frames 19 and 20, and is secured to said frames by screws 22 and 23 respectively. This front top-cap 21 is U-shaped and its side arms are provided with openings for receiving adjusting screws 24, 25.

A front bottom-cap 26, similar to the top-cap 21, covers the bottom of the forward part of the casing. This bottom-cap 26 is provided with adjusting screws 27, 27 similar to the screws 24, 25 of the top-cap 21.

A rear top-cap and a rear bottom-cap are also provided at the rear of the casing. The rear top-cap consists of a cross piece 28 and two side members 29 and 29$^a$, said parts being secured to the side frames 19 and 20 by the screws 30, 31, 32, respectively. Adjusting screws 33, 34, and 35 are also provided, for a purpose to be hereinafter more fully explained. The rear bottom-cap 36 is similar to the rear top-cap just described, and rests upon the rear supporting plate 17, previously mentioned. The cross-piece and side members of the bottom-cap 36 are secured to the bottoms of the side frames 19 and 20 by screws 37, and the rear bottom-cap is also provided with adjusting screws 38, 38, similar to the screws 33, 34, and 35. Rear side-caps 39, 39 are also provided upon the frames 19, and 20, these side-caps being secured to the frames by the screws 40.

A pair of cooperating U-forming die members 41 and 42 are located at the front end of the machine. These U-forming die members 41 and 42 are mounted between the front top-cap 21, the front bottom cap 26, and the front side-caps 26$^a$ and 26$^b$. The upper die member 41 is provided with a rib having a curved bottom and diverging sides, this rib fitting within and being slightly spaced from a similarly shaped recess in the lower die member 42. For adjusting the U-forming die, the front top-cap 21 is provided with a screw-bolt 43 which bears upon the top die member 41.

In order to bend the diverging sides of the U-shaped strip into parallelism, a pair of vertically arranged squaring-up rolls 44 and 45 are provided. These squaring-up rolls are carried by the shafts 44$^a$ and 45$^a$ respectively. The shafts 44$^a$ and 45$^a$ are in turn mounted in bearing boxes 46, 46, 47, 47, respectively, and are adapted to be adjusted by means of the bearing-box adjusting screws 24, 25, 27, 27, located in the front top-cap 21 and front bottom-cap 26, respectively.

The upper squaring-up roll 44, which is smaller than the lower squaring-up roll 45, is provided with a central annular rib 48 fitting within and spaced from a similarly shaped groove 49, formed in the lower squaring-up roll 45. As will be clear from Fig. 5, the flange at the right-hand edge of the groove 49 is of a slightly smaller diameter than the flange at the left-hand edge so that the strip when it is passed therethrough will have its sides of unequal height—the right-hand side being somewhat shorter than the left-hand side.

In order to provide means for initially starting the end of the strip through the machine, the ends of the shafts 44$^a$ and 45$^a$ are provided with intermeshing gears 50 and 51 respectively. The upper gear 50 is provided with a key-way fitting the key 52 and is adapted to be manually slid longitudinally into and out of locked position on the shaft 44$^a$ whenever desired.

Beyond the key 52, the shaft 44$^a$ is also provided with a squared end 53 to receive the starting handle 54. This starting handle 54 is provided with an enlarged end having a square opening adapted to fit over the square end 53 of the shaft 44$^a$.

When it is desired to start the strip through the machine, the gear 50 will be first slid along its shaft into mesh with the stationary gear 51. The end of the metal strip will then be manually forced through the U-forming die into engagement with said rolls. The operator will then turn the handle 54 in a clock-wise direction, causing the strip to travel through the remainder of the machine. The gear 50 should then be slid back along its shaft out of engagement with the gear 51, after which the end of the tube may be clamped by a pair of jaws 55 and 56 of a draw bar, as clearly shown in Fig. 1.

After the strip has passed through the squaring-up rolls, the next operation is to form a pair of locking flanges on its side edges. For this purpose an idler roll 57 is mounted on an inclined axis in the left-hand side frame 20 of the machine and secured to said frame by means of the inclined screw 58. This idler roll 57 is provided with a beveled edge 59, and said roll is mounted so that the line of its inner edge will be vertical and spaced from the vertical portion of the die. The bottom face of the idler roll is adapted to engage the edges of the metal strip and to bend them over against the bottom arm 60 of the looped-shaped mandrel holder 61, and also against the inclined edge 62 of a strip of tool steel 63 inserted within a suitable recess in the right-hand side frame 19. Both edges of the strip will be bent over to the right, as viewed in Fig. 6, or in other words the left-hand edge will be bent inwardly, and the right-hand edge outwardly.

The mandrel holder 61 and the tool steel insert 63 are secured to the side frame 19 by means of the screws 64 and 65 respectively, so that the position of the holder and insert may be readily adjusted whenever desired. The lower arm 60 of the mandrel holder is substantially semi-circular in section, as clearly shown in Fig. 6, and fits within a groove 66 formed in the top of an anvil 67, the latter being held within recesses 68 and 69, formed in the inner sides of the side plates 19 and 20.

The tube-supporting mandrel which is indicated by the numeral 70 has a threaded end 71 screwed into a threaded hole formed in the lower arm of the mandrel holder 61. The other end of the mandrel 70 is supported in the finishing die, as will be hereinafter more fully described.

The mandrel 70 which is substantially cylindrical in section is provided on the top with a longitudinal rectangular groove, and is tapered slightly from the center to each end, its diameter being largest at the center. The longitudinal groove in the top of the mandrel is horizontal throughout its length.

The anvil 67 is secured to the side plates 19 and 20 by means of a pair of cross bolts 72 and 73, and is provided with a recess 74 near its rear end to receive the central portions of the tube-forming rolls 75 and 76. These rolls 75 and 76 are mounted on shafts 77 and 78, and said shafts are secured to the side plates by means of the nuts 79 threaded upon the lower ends of said shafts 77 and 78. The shafts 77 and 78 are also provided with top slots 80 to receive a screw-driver or other suitable tool for adjusting the rolls 75 and 76.

The right-hand forming roll 75 is provided with a conical upper portion diverging outwardly from the top, and with a lower circular grooved section, the bottom of which is of slightly larger diameter than the top. The left-hand tube-forming roll 76 is provided with a conical upper portion diverging inwardly from the top, and a circular bottom groove cooperating with a similar groove on the roll 75, whereby the metal strip will be formed into a tube as indicated by the dotted and full lines shown in Fig. 7ᴬ.

In order to lock the flanged edges of the metal tube together, a transverse locking die member 81 is arranged above the rear end portion 82 of the anvil, as clearly shown in Fig. 8. When passing through the locking die, the inwardly bent flange of the tube will be squeezed down and locked about the outwardly bent flange. The transverse locking die member 81 may be adjusted by means of the adjusting screw 33 mounted in the rear top cap 28.

In order to complete the locking operation and produce the finished tube, the moving strip next is passed through a pair of vertically arranged tube-closing rolls 83 and 84. These tube-closing rolls, as clearly shown in Fig. 9, are provided with cooperating semi-circular grooves 85 and 86, which are adapted to surround the tube and give it a smooth cylindrical surface.

The tube-closing rolls 83 and 84 are secured to shafts 87 and 88 mounted in bearing boxes 89 and 90 respectively, similar to the bearing boxes 46 and 47 previously described. The bearing boxes 89 and 90 are mounted in suitable recesses in the side frames 19 and 20 as shown, and are adjustable by means of the screws 34, 35, and 38, 38 respectively, previously referred to. The upper tube-closing roll 83 is provided with side hubs 91 of smaller diameter than the upper roll, while the side hubs 92 of the lower tube-closing roll 84 are of larger diameter than the lower roll. It will thus be seen that the hubs 92 of the lower roll 84 will fit over the sides of the upper roll 83, and the rolls will be maintained in accurate registration.

The finishing operation is performed by passing the tube through a cylindrical final sizing die 93. This die 93 is made out of one piece of metal and is rigidly mounted in a tubular adjusting die-holder 94, which is provided with screw threads 95 on its outer surface adapted to engage corresponding screw threads 96 in an outer bracket 97.

Figure 3:
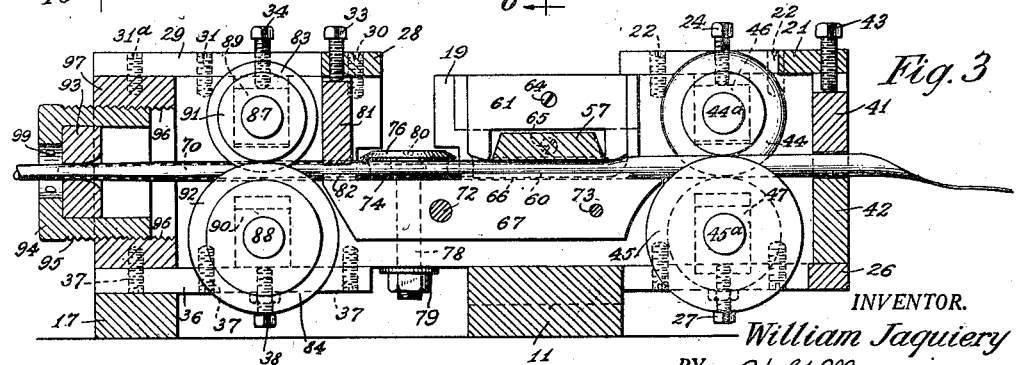
Fig. 3 is a side elevation of the same, with the metal strip and tube in operating position.

The outer bracket 97, as more clearly shown in Fig. 3, rests upon the rear bottom cap 36, and is held against the end of the side frames 19 and 20 by means of the screws 31ᵃ and 32ᵃ. The outer bracket 97 is provided with flat top and bottom surfaces and cylindrical side surfaces 98, 98.

In order to adjust the relative position of the sizing die 93 relative to the mandrel, the die-holder 94 is provided in its circumference with a series of uniformly spaced holes 99 to permit the insertion of a suitable tool.

In operation, when it is desired to form a tube by means of this machine, the end of the metal strip will be inserted by hand through the U-forming dies 41 and 42 and into engagement with the squaring-up rolls 44 and 45. The upper gear 50 will then be slid along the shaft 44ª into mesh with the lower gear 51. The handle 54 will then be fitted upon the squared end 53 of the shaft 44ª and rotated in a clock-wise direction until the end of the tube is pushed forward through the remainder of the machine. The gear 50 is then slid along the shaft 44ª out of mesh with the gear 51 and the tube may then be gripped by the jaws 55 and 56 of the draw bar. The power may then be turned on and the tube will be drawn through the machine continuously until the entire length of the metal strip has been formed into a tube.

The machine may be lubricated in any desired manner, but preferably by first passing the metal strip through a receptacle containing a lubricant. The metal strip may also be kept in a coiled condition beneath the surface of the lubricant.

When the completed tube is drawn off from the machine, it will ordinarily be kept in its normal straight condition, but when producing tubes of relatively small diameter, such tubes may be coiled on drums if desired.

One advantage of the present invention is the small number of operations necessary to be performed upon the strip in its course through the machine. Another advantage is the accessibility of the various elements of the mechanism, permitting adjustments and repairs to be readily made.

An important feature of this machine is that the edges of the strip are not flanged immediately as in former devices, but are formed into a U-shape before the flanging operation. This is of advantage because it eliminates much of the strain or pull which would otherwise be put on the tube during the preliminary forming steps.

While the machine will generally be employed for producing a tube with a circular outer surface, the invention is not to be limited to such a tube-forming machine. In Fig. 14, a modified form of finishing die and mandrel are illustrated, in which the mandrel is cylindrical while the final sizing die surrounding the mandrel is provided with a groove, so when these forms of die and mandrel are employed, a tube of the shape shown in Fig. 15 will be produced, having a cylindrical smooth inner surface and a rib on its outer surface.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a tube-forming machine, the combination with a die for bending a strip of metal into approximately the shape of a U having diverging sides, a pair of rolls for squaring-up said sides into parallelism, a cooperating roll and die for bending one edge of the U-shaped strip inwardly, and the other edge outwardly, a pair of cooperating rolls for forcing said bent edges into locking position, a die for locking said edges together, a pair of cooperating rolls for squeezing said edges together to form a smooth outer cylindrical surface, a mandrel for supporting the inner surface of said tube, and a final sizing die for reducing the diameter of said tube.

2. In a machine for forming a tube from a strip of sheet metal, a mandrel for supporting the inside of the tube, a die for shaping the outside of the tube, and means for moving the die to compensate for wear upon the die and mandrel.

3. In a machine for forming a tube from a strip of sheet metal, a mandrel for supporting the inside of the tube, a die for shaping the outside of the tube, and means for moving the die relative to the mandrel for adjusting the annular opening between the die and mandrel.

4. In a machine for forming a tube from a strip of sheet metal, a stationary mandrel for supporting the inside of the tube, and a movable adjusting die for taking up the wear upon the die and mandrel.

5. In a machine for forming a tube from a strip of sheet metal, a stationary mandrel for supporting the inside of the tube, said mandrel being tapered from the middle toward its ends, and having a rectangular groove formed in the top surface thereof, a die for shaping the outside of the tube, a threaded holder for said die and a cooperating threaded bracket adapted to engage the threads of said die holder.

6. In a tube-forming machine, means for bending an initially flat moving strip of metal into a U-shape, an interior mandrel and an outside roll for forming locking edges on said strip while said strip is still U-shaped, means for locking said edges together, and means attached to the finished end of said tube for pulling said strip through the machine.

7. In a tube-forming machine, the combination with means for bending a strip of metal into the shape of a U, of a cooperating bending roll and supporting die for forming subsequently locked edges on the edges of said U-shaped strip, and means for bending and locking said strip into tubular form.

8. In a tube-forming machine, the combination with a support, means for bending a strip of metal into the shape of a U, of a cooperating bending roll and supporting die for forming subsequently locked flanges on the arms of said strip while said strip is still U-shaped, said bending roll being mounted on an axis inclined to the plane of the path of the arms of said U-shaped strip, and means for bending said strip into tubular form and locking said flanges together.

9. In a tube-forming machine, the combination with means for bending a strip of sheet metal into the shape of a U having parallel arms of unequal length, of means for forming subsequently locked flanges on said arms, means for bending said strip into tubular form, and means for locking said flanges together.

10. In a tube-forming machine, the combination with means for bending a strip of sheet metal into the shape of a U, of a cooperating roll and die for forming a pair of subsequently locked edges on said strip, one of said edges being bent inwardly and the other bent outwardly, means for bending said strip into tubular form, and means for locking said edges to form a closed joint.

11. In a tube-forming machine, means for continuously bending an initially flat moving strip of sheet metal into the shape of a U, means for forming interlocking flanges on the edges of said strip, means for locking said flanges to form a closed tube, means for starting the end of said strip through said machine, and separate means for continuously withdrawing said tube from said machine.

12. In a tube-forming machine, the combination with means for continuously bending a strip of sheet metal into the shape of a U, of a supporting mandrel, means for forming flanges upon the edges of the strip while in the shape of a U, means for bending said flanged sides into interlocking engagement, and means for bending said flanges over one another to form a closed tube.

13. In a continuous tube-forming machine, the combination with means for bending over the edges of a moving strip of sheet metal in the same direction and approximately parallel to the original plane of said strip, of means for bending said strip into tubular form, a supporting mandrel and a die cooperating with said mandrel for squeezing said bent edges into interlocking engagement.

14. In a tube-forming machine, the combination with means for continuously bending over the edges of a moving U-shaped strip of sheet metal in the same direction, of means for bending said U-shaped strip into tubular form, a supporting mandrel, a die cooperating with said mandrel for forcing said bent edges into interlocking engagement, and a pair of pressure rolls for consolidating said strip into tubular form.

15. In a tube forming machine, the combination with means for bending a continuously moving strip into the shape of a U having side arms of unequal height, of means for overlapping and interlocking said side arms, and means for shaping said strip into tubular form.

16. In a tube forming machine, the combination with means for bending a continuously moving strip into the shape of a U, of a roll having its axis inclined to the plane of the path of the side arms of said U-shaped strip, means for overlapping and interlocking said side arms, and means for shaping said strip into tubular form.

17. In a portable tube-forming machine, the combination with means for bending a continuously moving strip into the shape of a U, of means inclined to the plane of the path of the side arms of the U-shaped strip for forming locking flanges on the edges of said side arms, means for overlapping and interlocking said flanges, and means for shaping said strip into tubular form.

In testimony whereof, I have affixed my signature to this specification.

WILLIAM JAQUIERY.